United States Patent Office 3,324,986
Patented June 13, 1967

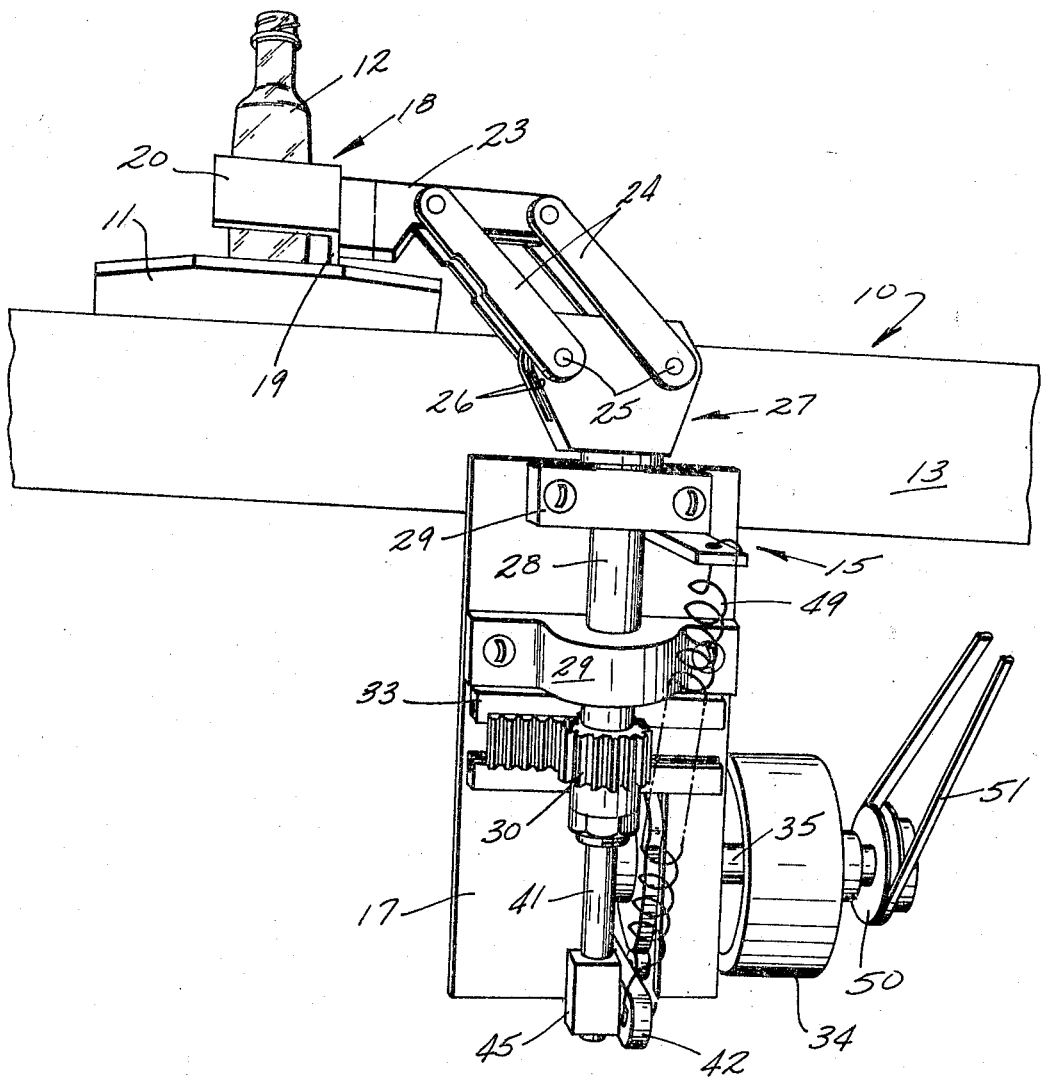

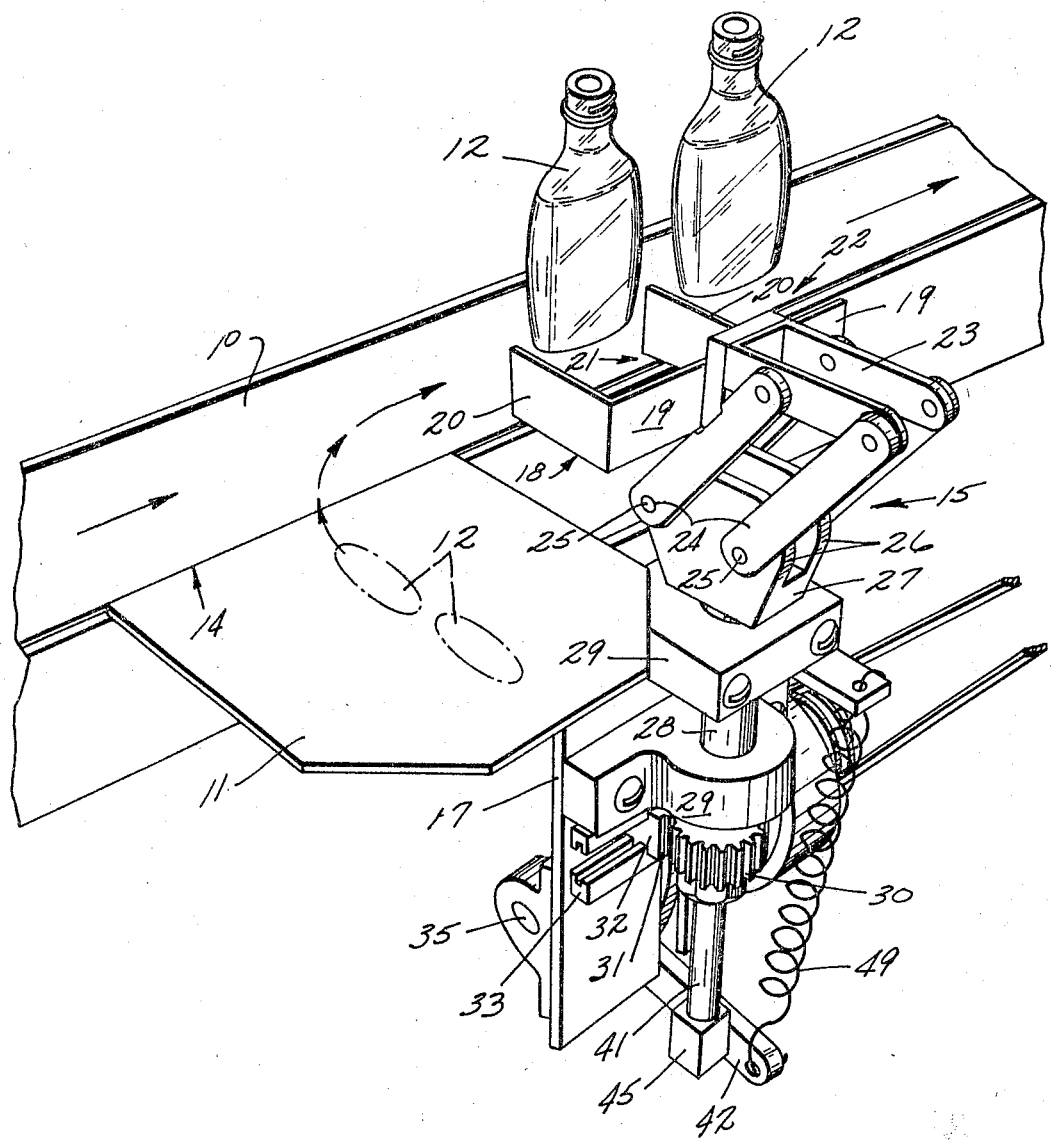

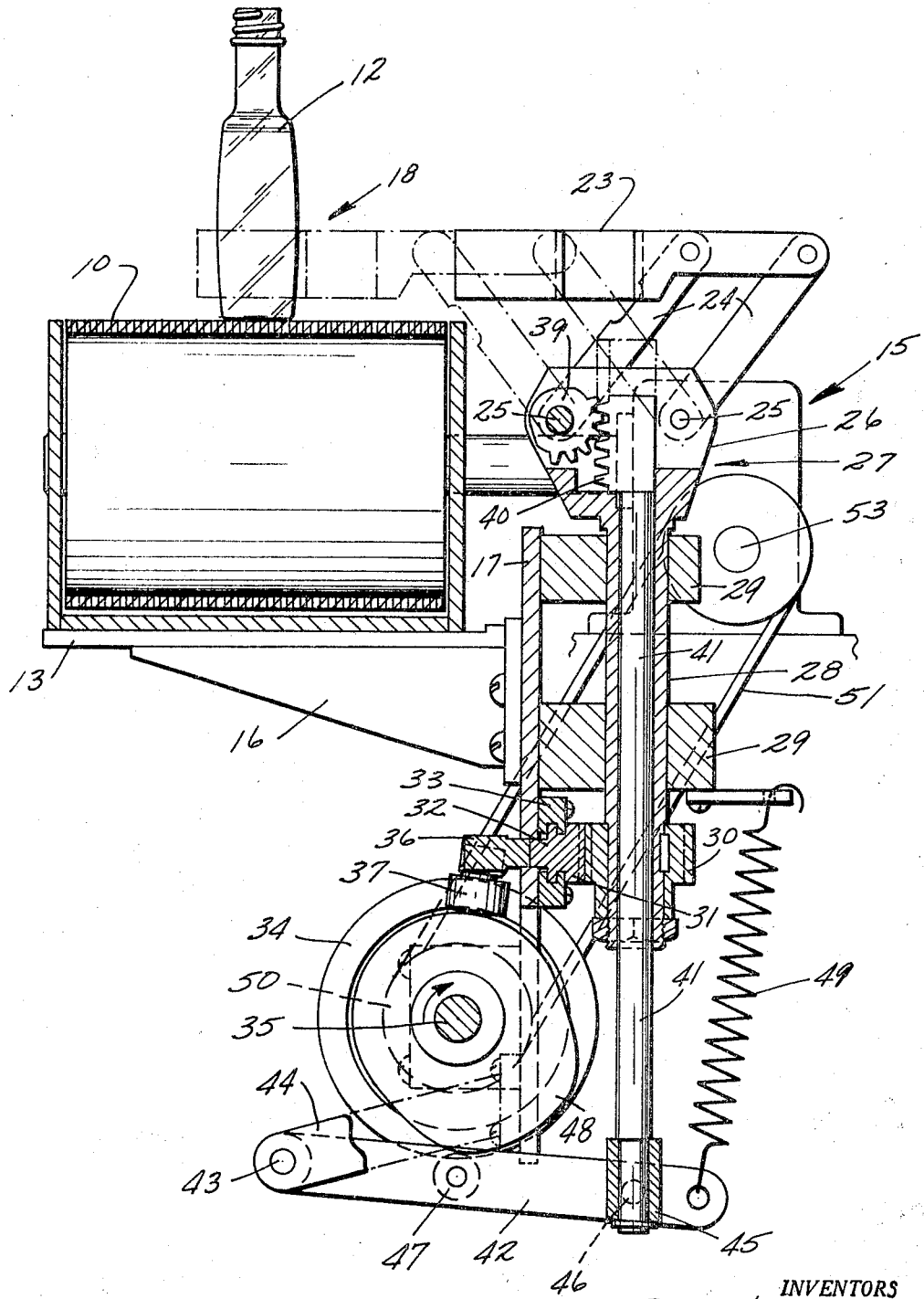

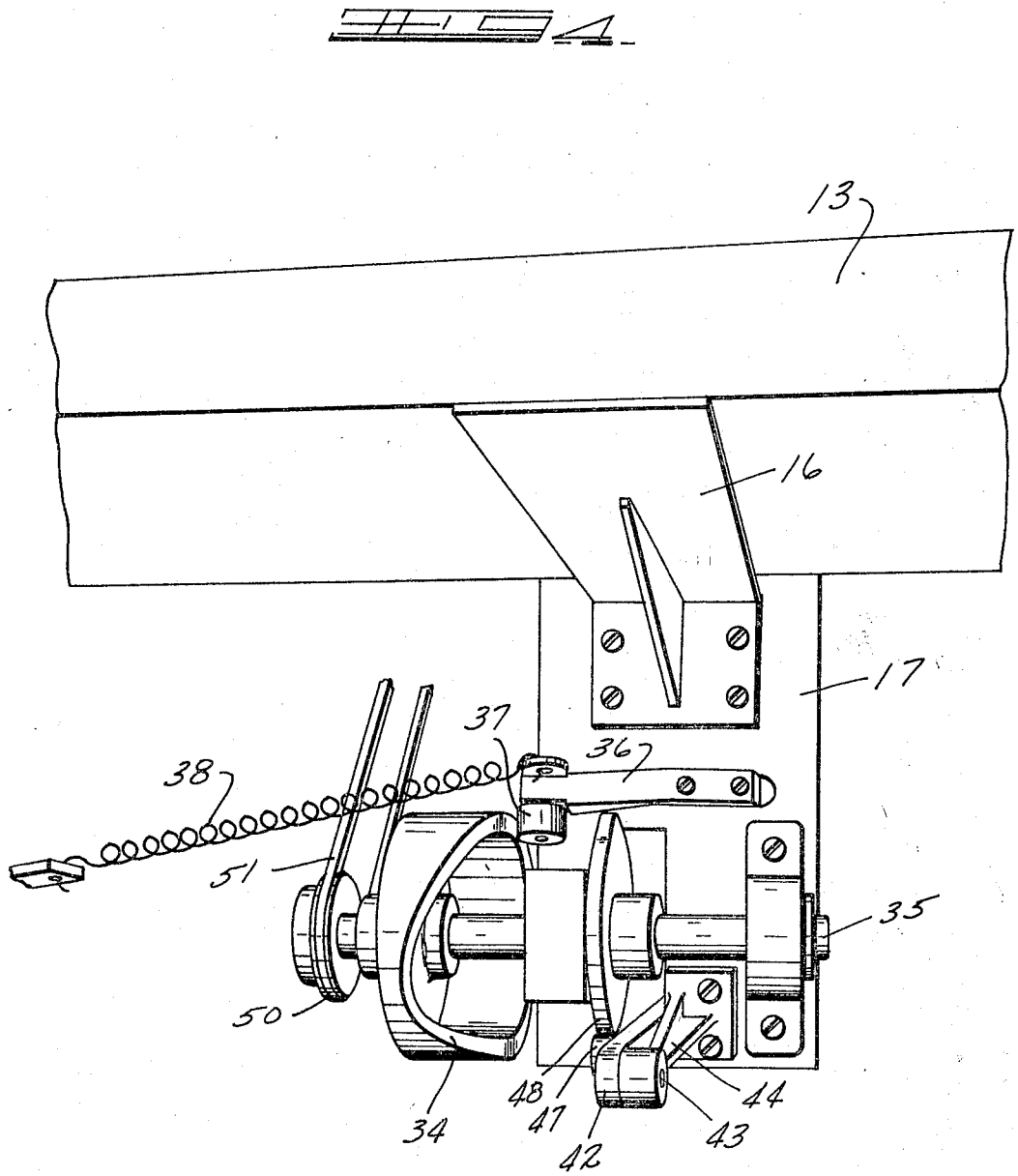

3,324,986
GLASSWARE HANDLING APPARATUS
Dale H. Dierksheide, Streator, Ill., and Urban P. Trudeau, Toledo, Ohio, assignors to Owens-Illinois, Inc., a corporation of Ohio
Filed Jan. 13, 1965, Ser. No. 425,186
7 Claims. (Cl. 198—20)

Our invention relates to glassware handling apparatus and more particularly to apparatus for transferring bottles or similar articles in pairs from a dead-plate beside a glassware forming machine, to a conveyor which in part delivers the bottles to an annealing lehr.

In the production of glassware, such as bottles and jars, they may momentarily stand upright in pairs upon the mold bottom plates of the forming machine, awaiting grasping by a take-out device which deposits them (again in upright side-by-side relationship) upon a dead-plate. An example of a forming machine operating on the above principle is the well known "I. S." machine which comprises a plurality of individual sections, or forming units, arranged side-by-side so that each of the sections produces the articles in pairs in a predetermined sequence, leaving them upright on their bottom plates, ready for transfer to the dead-plate, where the ware is cooled sufficiently to be self-supporting. On this dead-plate the articles are disposed in the same relationship as when on the mold bottom plates, viz, such that an imaginary line extending horizontally through the two articles will be at about right angles to the length of the adjacent horizontal conveyor. In the interest of proper, efficient handling at succeeding points between the dead-plate and annealing lehr, the bottles or such articles must be transferred to the conveyor in the same spaced-apart relationship as prevailed at the dead-plate, but placed upright upon the conveyor in single file. Such transfer is effected by pushers which are disclosed in various forms in prior U.S. patents.

Such pushers, however, tend to so move the articles that they are irregularly spaced and often in a somewhat staggered relationship upon the conveyor. As a consequence, a serious handling problem has existed in that the articles are not presented to the conveyor in the relationship occupied on the mold bottom plates and dead-plate. Therefore, later transfer of the articles to the cross-conveyor and from same to the conventional lehr conveyor are unduly complicated.

Our invention, therefore, has for an important object the provision of a novel transfer apparatus for so pushing pairs of articles onto the machine conveyor from the dead-plates at the take-out stations of the forming machine, that such articles of each pair so transferred will be spaced apart uniformly and in single file upon the conveyor preparatory to deposition upon the cross-conveyor at the inlet end of the lehr.

Another object of our invention is the provision of a novel article transfer apparatus in which a pusher is pivoted at a point remote from the dead-plate and so actuated that it has sequential initial pushing engagement with the articles on the dead-plate, first engaging the foremost article of the pair, then the rearmost article, and thereupon moving the articles together or collectively along an arcuate path so that they occupy single file, spaced apart positions on the machine conveyor.

A further object of our invention is the provision of novel means for projecting and retracting or withdrawing the article pusher relative to articles while on either the dead-plate or conveyor.

In effecting the transfer of certain types of glassware, such as flasks or other panel-type or non-circular bottles, we have determined that they are better oriented at the end of the transfer operation if stationary guide members are used in conjunction with our pusher device. Therefore our invention contemplates the use of such guide means to assure proper orientation of each article of a pair of same with regard to their major transverse axis as related to the length of the conveyor.

Other objects will be in part apparent and in part pointed out hereinafter.

In the accompanying drawings forming a part of our application:

FIG. 1 is a perspective view of transfer apparatus embodying our invention, showing the pusher engaging articles on a dead-plate.

FIG. 2 is a perspective view of the apparatus with the pusher retracted from engagement with transferred articles.

FIG. 3 is a vertical sectional view, partly in elevation, of the transfer apparatus in the FIG. 2 position.

FIG. 4 is a perspective view of the cam mechanism which actuates the pusher and synchronizes the oscillatory and vertical motions of the pusher.

Our invention, in its illustrated embodiment, is shown arranged beside a horizontal machine conveyor 10 and a dead-plate 11 to which a pair of articles, such as bottles 12, are transferred from a forming machine (not shown) by any suitable device (not shown) and placed upright in the same relationship they occupied upon the mold bottom plates of the forming machine. This is the relationship desired when the articles finally come to rest upon the machine conveyor 10, except that they are in single file and if panelware, their major transverse axis should extend along the length of the conveyor (FIG. 2). The conveyor, as shown, is of the chain-belt type, being conventionally supported upon a frame 13. The dead-plate 11, which may incorporate cooling means (not shown) extends laterally from the frame 13, having an inner edge 14 lying almost in abutting relationship to the adjacent longitudinal margin of the conveyor 10. Thus smooth transfer of the articles, by pushing them from the dead-plate to the conveyor, is assured, with no likelihood of upsetting them.

The pusher or transfer apparatus 15 is mounted upon the conveyor frame 13 by means of a horizontal bracket 16 and a vertical anchor plate 17 which is secured to the bracket and extends both above and below the latter. This plate 17 directly supports the pusher or transfer apparatus 15.

The transfer apparatus comprises a bottle engaging jaw 18, or pusher (FIG. 2) which consists of a horizontal base plate 19 set on edge and a pair of on-edge parallel fingers 20, one such finger projecting forwardly at the medial point of the base plate, while the other finger, although parallel to the first-named one, is at the rearmost end of said base plate. Thus the structure provides a sweep or pusher device wherein one bottle-accommodating pocket 21 has a U-shaped outline and the other pocket 22 has an open forward end and is more or less L-shape in outline. The fingers extend horizontally with open sides of the jaws or pockets facing forwardly so that when projected, the middle finger enters the space between the pair of bottles 12, while the latter occupy upright positions on the dead-plate (FIG. 2). The jaw then pivots clockwise 90° in a horizontal plane, bringing it to a position over the conveyor and turning the bottles collectively through an angle of 90° so that they are in single file on said conveyor. Because of the jaw construction, it is apparent that as it begins its bottle pushing function, the foremost bottle will advance a short distance before the rearmost finger 20 contacts the second bottle, such being due to the middle finger 20 contacting the front bottle ahead of engagement between the back bottle and rearmost finger 20 of the jaw.

The jaw 18 is supported upon a holder 23 (FIGS. 2 and 3) which is connected by depending parallel links 24 to a pair of pivot pins 25, these pins being disposed horizontally in spaced apart parallel relationship in the upstanding parallel arms 26 of a U-shaped carrier head 27. This carrier head 27 is disposed at the upper end of a vertical sleeve 28 or tube which is journaled in a pair of bearing blocks 29, such being mounted upon the anchor plate 17. This sleeve or tube 28 may be oscillated in said bearings 29 to swing the jaw 18 through an angle of 90° between the dead-plate 11 and machine conveyor 10. Oscillation of the sleeve 28 is effected by cam actuated rack bar and pinion mechanism comprising a pinion 30 or spur gear, keyed to the tube 28 below the lowermost bearing block 29 and meshing with a rack bar 31. This rack bar 31 is carried by and may be an integral part of a horizontal slide 32 which is mounted in a slideway 33 or guide, such being secured to the previously mentioned anchor plate 17. The rack bar 31 is reciprocated by a rotary cam 34 (FIG. 4) which is mounted upon a driven horizontal shaft 35. An arm 36 attached to the rack bar 31 carries a cam roll 37 which rides upon said cam 34, the roll being held yieldingly in contact with the cam by a spring 38. Thus it is evident that with rotation of the cam 34, such being synchronized with the forming machine cycle, the jaw 18 will be moved back and forth through an arc of 90° between the dead-plate 11 and machine conveyor 10.

Projection and withdrawal, or retraction, of the jaw to alternately engage and release pairs of bottles or other such articles, may well be obtained by mechanism comprising a push-rod actuated rack and pinion unit. Specifically, this consists of a sector gear 39 or pinion positioned between the upstanding arms 26 of the head 27 and secured to one of the pivot pins 25 or rods. A rackbar 40 at the upper end of a vertical push-rod 41 meshes with the pinion 39 and in response to reciprocation of the push-rod, the pinion oscillates about its pivot pin 25 to thereby alternately project and retract the jaw 18 relative to the dead-plate 11 and conveyor 10. Reciprocation of the push-rod is effected in synchronism with the swinging motion of the jaw 18 by a cam operated lever 42. This lever 42 is pivoted at one end to a horizontal pin 43 which is positioned at the free end of an arm 44 attached to the lower end of the carrier plate 17. A short sleeve 45 secured to the lower end of the push-rod 41 carries a pivot pin 46 interconnecting said push-rod and lever 42. A cam roll 47 on said lever rides upon a rotary cam 48 which is mounted upon the cam shaft 35 and so contoured and angularly positioned relative to the other cam 34 that the two cams effect and the jaw's movement as required. A coil spring 49 yieldingly holds the cam roll 47 in contact with the cam 48, as is apparent.

This apparatus, of course, must be timed to cooperate properly with functioning of a bottle machine (not shown) to the end that the jaw 18 is moved in proper relation to formation of bottles and removal of same from the machine. To this end the cam shaft 35 may be driven by means of a positive drive means, such as the pulley 50 and belt 51, the latter trained over an upper pulley 52. This upper pulley 52 is carried by a shaft 53 (FIG. 3) which may well be driven directly by the forming machine. This positive drive means should be a synchronized, no-dip, drive timing the shaft 35 with the machine shaft 53. Such timing is quite common procedure, as is known.

In operation it is understood that conventional take-out device (not shown) lifts a pair of bottles from the forming machine mold and places them upright upon the dead-plate 11 as indicated by dot and dash lines in FIG. 2. Thereupon the jaw 18 moves in (FIG. 1) so that the front finger 20 enters the space between the two bottles and the rearmost finger 20 takes a position near the rearmost bottle 12. Immediately the cam 34 initiates movement of the jaw 18 about the axis of the tube 28, ultimately positioning the bottles in single file upon the conveyor 10 and in proper spaced apart relationship. At this time the cam 48 operates the described mechanism to withdraw or retract the jaw 18 as indicated in FIG. 2. Because the conveyor is of the continuous moving type, the front bottle of each pair transferred will being to advance just prior to release of the back bottle from the jaw 18, so that these bottles are spaced part as desired for later handling.

Modifications may be resorted to within the spirit and scope of the appended claims.

We claim:

1. In a bottle transfer apparatus, a jaw comprising a pair of parallel spaced apart horizontal fingers providing two side-by-side bottle receiving pockets, each having an open side, a holder for the jaw, mechanism below the holder for reciprocating the jaw horizontally into and out of engagement with the bottles comprising a head member, a rack and sector gear device carried by the head member, parallel links connecting the holder and head member, means for actuating the rack and sector gear device, and means for oscillating the jaw horizontally through an arc of about 90° extent.

2. In a bottle transfer apparatus as defined in claim 1, the last named means being a vertical tube depending from said head member, rack and pinion mechanism for oscillating the tube and head member, and means for actuating the rack and pinion mechanism.

3. In apparatus as defined in claim 2, the last-named means being a continuously rotating cam and a cam roll carrying arm connected to the rack and pinion mechanism.

4. In bottle transfer apparatus, jaw means engageable with and holding a pair of upright bottles, said bottles spaced apart in the direction of intended movement during transfer, means for oscillating the jaws through an arcuate path of about 90° extent in a horizontal plane thereby to push the bottles onto a horizontal conveyor in upright position and in single file on the latter, and means for moving the jaws laterally of said path into and out of engagement with the pair of bottles, the last named means comprising a holder for the jaw means, parallel links pivoted to and depending from the holder, and a rack and sector gear device for rocking the parallel links.

5. In a bottle transfer apparatus as defined in claim 4, the oscillating means being a vertical tube connected at its upper end to the jaw means, a cam operated rack and pinion device for oscillating the tube on its axis, there being a holder for the jaw means, parallel links pivoted to the holder and a cam operated device for rocking said links.

6. In combination, a dead-plate for supporting a pair of bottles in upright spaced apart relationship with said bottles spotted in single file along a line of intended movement, a horizontal conveyor onto which bottles are to be pushed a pair at a time from the dead-plate to occupy upright single file positions along said conveyor, bottle transfer apparatus comprising a horizontal pusher-type jaw having plural bottle receiving pockets each open on one side to receive and release bottles, means for moving the jaws horizontally through an arc of about 90° between positions over the dead-plate and conveyor thereby to push the bottles onto the latter, and means for moving the jaws laterally of said arc into and out of engagement with the botles, the means for moving the jaw means laterally comprising a cam actuated rack and sector gear device, a holder for the jaws and parallel links interconnecting the holder and rack and sector gear device and rockable in response to actuation of the latter and means for timing operation of the cams to effect projection of the jaws over the dead plate and retraction of said jaws from a position over the conveyor.

7. In the combination defined in claim 6, the means for moving the jaw through the horizontal arc comprising a cam actuated rack and pinion device.

References Cited
UNITED STATES PATENTS

| | | | |
|---|---|---|---|
| 2,355,036 | 8/1944 | Berthold | 198—24 |
| 2,586,865 | 2/1952 | Roselle | 198—24 |
| 2,660,831 | 12/1953 | Rowe | 65—260 |
| 3,249,200 | 5/1966 | Rowe | 198—24 |
| 3,249,201 | 5/1966 | Rydlewicz | 198—24 |

EVON C. BLUNK, *Primary Examiner.*

EDWARD A. SROKA, *Examiner.*